United States Patent
Suzuki et al.

(10) Patent No.: US 7,395,610 B2
(45) Date of Patent: Jul. 8, 2008

(54) DIGITAL MEASURING INSTRUMENT

(75) Inventors: Mikio Suzuki, Nakatsugawa (JP); Shuuji Hayashida, Kawasaki (JP); Toshiharu Ozeki, Kawasaki (JP); Rie Tanaka, Kawasaki (JP); Yoshifumi Saito, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 36 days.

(21) Appl. No.: 11/516,709

(22) Filed: Sep. 7, 2006

(65) Prior Publication Data
US 2007/0056183 A1 Mar. 15, 2007

(30) Foreign Application Priority Data
Sep. 12, 2005 (JP) .............................. 2005-263989

(51) Int. Cl.
*G01B 3/22* (2006.01)
(52) U.S. Cl. .......................................... 33/832; 33/501
(58) Field of Classification Search ........... 33/832–838, 33/783, 784, 791–795, 555, 556, 558, 559, 33/561, 501, 542, 544.2, 542.1, 806
See application file for complete search history.

(56) References Cited

U.S. PATENT DOCUMENTS

| | | | | |
|---|---|---|---|---|
| 790,665 A * | 5/1905 | Spalding | ....................... | 33/794 |
| 1,433,076 A * | 10/1922 | Green | ......................... | 33/556 |
| 1,695,453 A * | 12/1928 | Carpenter | .................. | 33/501.4 |
| 4,062,122 A * | 12/1977 | Rutter | .......................... | 33/501 |
| 4,495,701 A * | 1/1985 | Nakadoi | ....................... | 33/558 |
| 4,528,755 A * | 7/1985 | Kanda et al. | .................. | 33/559 |
| 4,747,215 A * | 5/1988 | Waikas | ......................... | 33/763 |
| 4,748,861 A * | 6/1988 | Matsumoto et al. | ........ | 73/866.3 |
| 5,201,131 A | 4/1993 | Wilkins | | |
| 5,335,190 A * | 8/1994 | Nagle et al. | .................. | 702/154 |
| 5,440,819 A * | 8/1995 | Marsh et al. | ................ | 33/501.6 |
| 5,768,798 A | 6/1998 | Takahashi et al. | | |
| 5,979,069 A * | 11/1999 | Hayashida et al. | ............ | 33/556 |
| 6,412,187 B1 | 7/2002 | Sasaki et al. | | |
| 2007/0193046 A1* | 8/2007 | Arlinsky | .................. | 33/366.11 |

FOREIGN PATENT DOCUMENTS

| | | |
|---|---|---|
| EP | 1 022 539 A2 | 7/2000 |
| GB | 2 317 489 A | 3/1998 |
| JP | A 5-241770 | 9/1993 |
| JP | A 8-179851 | 7/1996 |
| JP | A 8-278121 | 10/1996 |
| JP | A 2001-312228 | 11/2001 |

* cited by examiner

*Primary Examiner*—G. Bradley Bennett
*Assistant Examiner*—Amy Cohen Johnson
(74) *Attorney, Agent, or Firm*—Oliff & Berridge, PLC

(57) ABSTRACT

A digital indicator 1 includes a body case (10), a spindle (30) provided to the body case (10), the spindle (30) being movable in an axial direction, a displacement detector (40) that detects a moving amount of the spindle (30), and a digital display (50) that digitally displays the moving amount detected by the displacement detector (40). The display surface of the digital display (50) is arranged on the body case (10) in an attitude substantially orthogonal to the moving direction of the spindle (30) and deviated from the moving axis of the spindle (30).

4 Claims, 5 Drawing Sheets

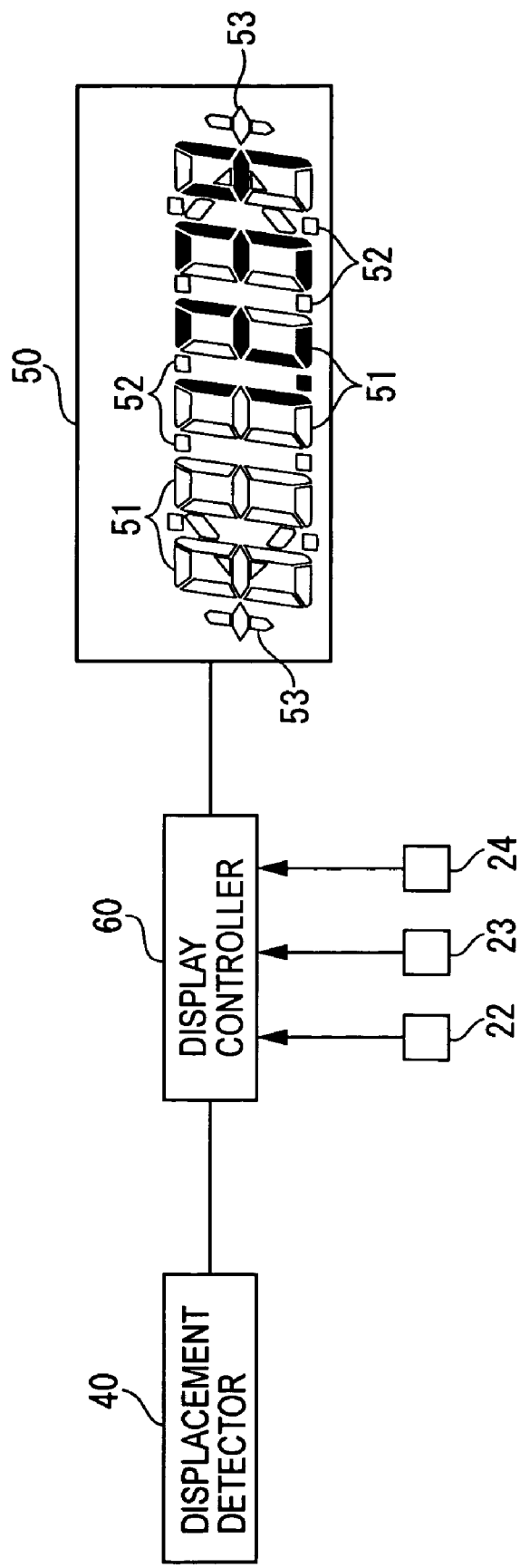

DIGITAL MEASURING INSTRUMENT

BACKGROUND OF THE INVENTION

1. Field of the Invention

The present invention relates to a digital measuring instrument. Specifically, the present invention relates to a digital measuring instrument whose display surface is arranged in an attitude substantially orthogonal to a moving direction of a spindle.

2. Description of Related Art

Conventionally, there has been known a digital indicator as the digital measuring instrument which measures dimensions, such as thickness, of a workpiece from a moving amount of a spindle and digitally displays the measured result.

The conventional digital indicator includes a body case, a spindle provided to the body case, the spindle being movable in the axial direction, a displacement detector that detects a moving amount of the spindle, and a digital display that digitally displays the moving amount detected by the displacement detector.

Since a display surface of the digital display is typically provided on a front surface of the body case, namely on a surface parallel with a moving direction of the spindle movably provided to the body case, when a measurement is performed in a condition where it is difficult to visually check the display surface from the front side of the display surface, the measured value displayed on the display surface will be difficult to read.

To solve this problem, there has been developed a so called "back-plunger" type digital dial gauge (refer to U.S. Pat. No. 5,768,798, FIGS. 4 to 6, etc.).

In the back-plunger type digital dial gauge, a body case having a digital display is movably provided with a spindle in the direction orthogonal to the display surface of the digital display, and a movable member movable in the direction orthogonal with the moving direction of the spindle. Also, a conversion mechanism is provided between the spindle and the movable member for converting a moving amount of the spindle into the moving amount of the movable member.

However, in the back-plunger type digital dial gauge described in the document, since the digital display is arranged on the body case in a position right above the spindle so as to be orthogonal to the moving direction of the spindle, the moving stroke of the spindle is restricted by the digital display, and therefore it is difficult to obtain a digital dial gauge having a spindle with a long moving stroke.

SUMMARY OF THE INVENTION

An object of the present invention is to provide a digital measuring instrument in which a digital display is arranged in an attitude substantially orthogonal to a moving direction of a spindle, and in which a moving stroke of the spindle can be set long.

A digital measuring instrument according to an aspect of the present invention includes: a body case; a spindle provided to the body case, the spindle being movable in the axial direction; a displacement detector that detects a moving amount of the spindle; and a digital display that digitally displays the moving amount detected by the displacement detector, in which a display surface of the digital display is arranged on the body case in an attitude substantially orthogonal to the moving direction of the spindle and deviated from the moving axis of the spindle.

With such a configuration, since the display surface of the digital display is arranged on the body case in an attitude substantially orthogonal to the moving direction of the spindle and deviated from the moving axis of the spindle, the movement of the spindle is not restricted by the digital display even if the moving stroke of the spindle is set long. Thus, the moving stroke of the spindle can be set long. Further, since the digital display is arranged on the body case in an attitude substantially orthogonal to the moving direction of the spindle, the displayed value of the digital display can be read from the axial direction of the spindle. In other words, the advantage of a so called back-plunger type measuring instrument can be maintained.

It is preferred that in the digital measuring instrument described above, the spindle penetrates the body case and is provided with a probe at one end thereof projecting from the body case, and the display surface of the digital display is arranged on a surface of the body case which supports the other end of the spindle.

With such a configuration, since the display surface of the digital display is arranged on a surface of the body case, from which the other end of the spindle projects (namely, a surface of the body case, which supports the end of the spindle opposite to the end having the probe), when, for example, the digital indicator is disposed in an attitude so that the spindle extends in a vertical direction and the probe is downward directed, the digital display is on the upper side of the body case, and therefore the displayed value of the digital display can be easily read. In other words, the displayed value of the digital display can be read from right above.

It is preferred that the digital measuring instrument described above further includes: an output connector for outputting the moving amount of the spindle detected by the displacement detector to the outside, the output connector being arranged on a surface of the body case substantially parallel with the moving direction of the spindle.

With such a configuration, since the output connector, which outputs the moving amount of the spindle detected by the displacement detector to the outside, is arranged on the surface of the body case substantially parallel with the moving direction of the spindle, there is no concern that visibility of the digital display might be impaired by a cable connected to the output connector. In other words, since the digital display and the output connector are respectively disposed on the body case on surfaces orthogonal to each other, even when the cable is connected to the output connector, since the cable is drawn out in parallel with the display surface of the digital display, there is no concern that visibility of the digital display might be impaired by the cable connected to the output connector.

It is preferred that the digital measuring instrument described above further includes: a display inversion selector that inverts information displayed on the digital display by 180°.

With such a configuration, since the information displayed on the digital display can be inverted by 180°, in the case where the information displayed on the digital display is read from the axial direction of the spindle, the information can be correctly read even from a direction different by 180°.

For example, when the measurement is performed in a state where the body case is rotated by 180° around the axis of the spindle, the information displayed on the digital display is inverted by 180°. Even when the measurement is performed in such a state, since the information displayed on the digital display can be inverted by 180°, the user can correctly read the information displayed on the digital display without changing his posture.

It is preferred that in the digital measuring instrument described above, the digital display includes plural digits of 7-segment display elements each being formed by arraying seven segments in the shape of "8", and the display inversion selector has a selection switch and switches the lighting condition of the 7-segment display elements in accordance with the state of the selection switch so that a figure displayed on the digital display is inverted by 180°.

With such a configuration, since the digital display includes plural digits of 7-segment display elements each being formed by arraying seven segments in the shape of "8", and since the display inversion selector switches the lighting condition of the 7-segment display elements in accordance to the state of the selection switch so that the figure displayed on the digital display is inverted by 180°, the figure can be displayed in two different directions without employing additional display elements inverted by 180°. Thus the digital measuring instrument can be economically configured.

BRIEF DESCRIPTION OF THE DRAWINGS

FIG. 3 is a block diagram showing display-related portions of the embodiment;

DETAILED DESCRIPTION OF PREFERRED EMBODIMENT(S)

An embodiment of the present invention will be described below with reference to the attached drawings.

<Configuration>

Figure 1:
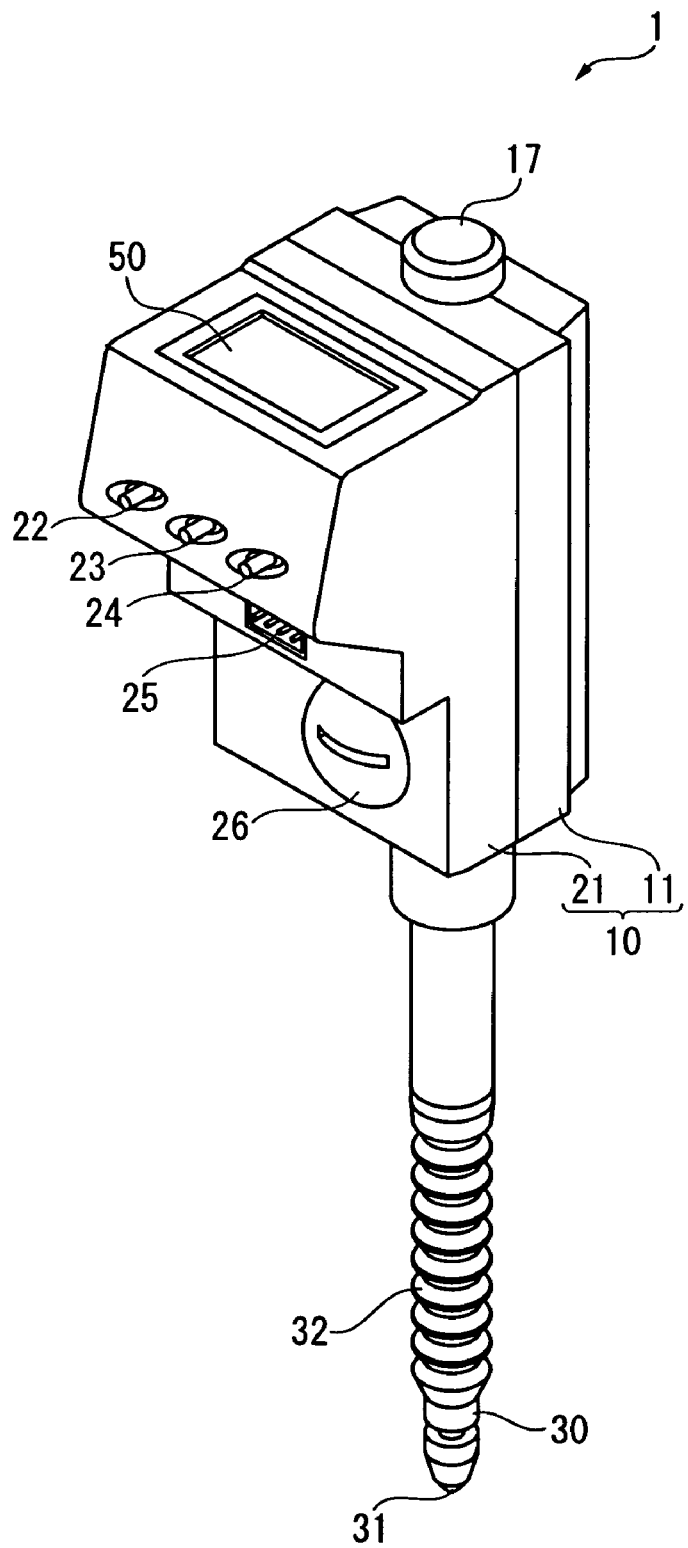
FIG. 1 is a perspective view showing a digital indicator of an embodiment of the present invention.
Figure 2:
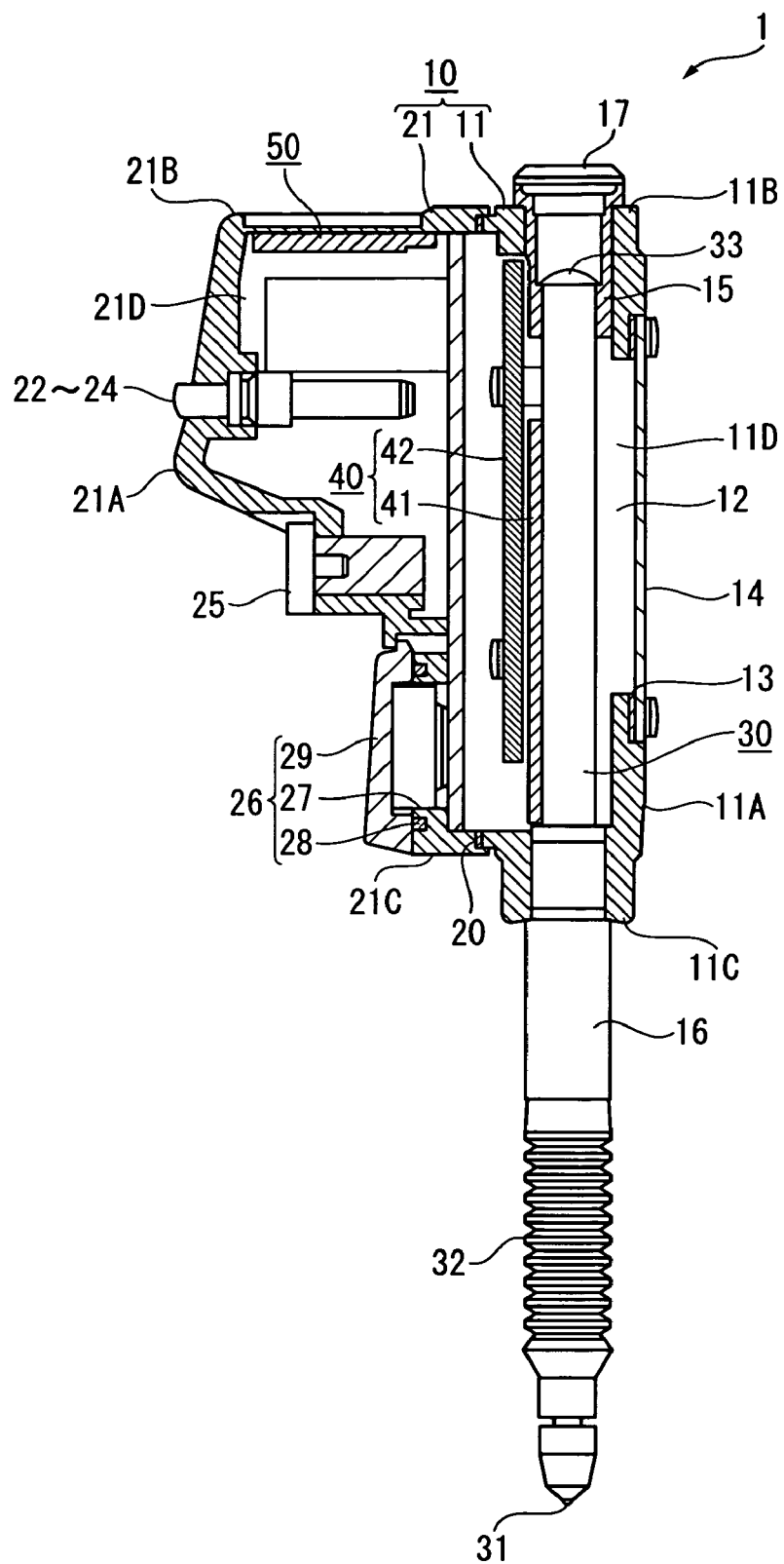
FIG. 2 is a cross section showing the embodiment.

FIG. 1 is a perspective view showing a digital measuring instrument (a digital indicator) of the embodiment, and FIG. 2 is a cross section showing the embodiment.

As shown in FIGS. 1 and 2, a digital indicator 1 of the present embodiment includes a body case 10, a spindle 30 axially movably provided to the body case 10, a displacement detector 40 that detects a moving amount of the spindle 30, and a digital display 50 that digitally displays the moving amount detected by the displacement detector 40.

The body case 10 includes a base frame 11 and a lid frame 21 engaged with an opening of the base frame 11 via a waterproof packing 20.

The base frame 11, which has a shape of a bottomed box, includes a bottom wall 11A, an upper wall 11B formed around the bottom wall 11A, a lower wall 11C, and side walls 11D. The bottom wall 11A is formed with an opening 12, and a lid plate 14 is detachably attached to the opening 12 via a waterproof packing 13. Bearing cylinders 15, 16 are respectively engaged into the upper wall 11B and the lower wall 11C to support the spindle 30 so that the spindle 30 can move in the axial direction. A plug member 17 is screwed to an upper end face of the bearing cylinder 15.

The lid frame 21, which has a shape of a box, includes an upper wall 21B flush with the upper wall 11B, a lower wall 21C flush with the lower wall 11C, side walls 21D flush with the side walls 11D, and a front wall 21A that covers tip end sides of the walls 21B, 21C, 21D. The front wall 21A is provided with three switches 22, 23, 24 in an upper position thereof, an output connector 25 in an intermediate position thereof, and a battery housing portion 26 in a lower position thereof. Of the three switches 22, 23, 24, the switch 22 serves as a power ON/OFF switch, the switch 23 serves as a zeroset switch, and the switch 24 serves as a selection switch for selecting inverted display. The output connector outputs the moving amount of the spindle 30 detected by the displacement detector 40 to the outside. The output connector 25 is arranged on a surface of the body case 10 substantially parallel with the moving direction of the spindle 30. The battery housing portion 26 includes a battery housing hole 27, and a battery lid 29 detachably attached to the battery housing hole 27 via a waterproof packing 28.

The spindle 30 is axially movably provided in the bearing cylinders 15, 16. The spindle 30 extends so that one end thereof passes through the body case 10 and projects to the outside. The one end of the spindle 30 projected from the body case 10 is provided with a spherical probe 31. A bellows cylinder 32 for covering the outer circumference of the spindle 30 is provided between the one end of the spindle 30 and the bearing cylinder 16. The other end of the spindle 30 is provided with a stopper 33 engaged with a step portion of the bearing cylinder 15 so as to prevent the falling of the spindle 30. Incidentally, the spindle 30 is constantly biased downward (toward the bottom side of FIG. 2) by a spring (not shown).

The displacement detector 40 detects the moving amount of the spindle 30 as an electrical signal. The displacement detector 40 includes a main scale 41 fixed on a side face of the spindle 30, and a signal processing circuit 42 provided inside the body case 10 and having an index scale arranged so as to face the main scale 41 with a gap therebetween. Incidentally, as to the detection principle of the displacement detector 40, the displacement detector can be any one of a photoelectric type, an electrostatic capacitance type, an electromagnetic type and the like, as long as it can detect the moving amount as an electrical signal.

As shown in FIG. 3, the digital display 50 digitally displays, through a display controller 60, the moving amount detected by the displacement detector 40. The digital display 50 is arranged on the body case 10 in an attitude substantially orthogonal to the moving direction of the spindle 30 and deviated from the moving axis of the spindle 30. Specifically, the digital display 50 is arranged on the upper wall 21B of the body case 10, which supports the other end of the spindle 30. The digital display 50 includes six digits of 7-segment display elements 51 each being formed by arraying seven segments in the shape of "8". Decimal point display elements 52 are respectively arranged between the display elements 51 at an upper portion and a lower portion, and positive/negative display elements 53 are respectively arranged on the right side of the display element 51 displaying the minimum digit and on the left side of the display element 51 displaying the maximum digit.

The display controller 60 makes the digital display 50 digitally display the moving amount detected by the displacement detector 40 and constitutes a display inversion selector that, in a condition where an inverted display mode is selected by switching the selection switch 24, switches and displays a figure displayed on the digital display 50 so that the figure is inverted by 180°. In other words, the display controller 60 has a function of switching the lighting condition of the 7-segment display elements according to the state of the selection switch 24 so that the figure displayed on the digital display 50 is inverted by 180°.

<Operation>

In use, measurement is performed in a state where the body case 10 is fixed to a measuring jig. To perform the measurement, the spindle 30 is pressed upward against the spring (not shown), a reference block is mounted below the spindle 30, and the spindle 30 is lowered. In a state where the spindle 30 abuts on the reference block, when the zeroset switch 23 is pressed, the displayed value of the digital display 50 is set to zero.

After that, the reference block is removed, a workpiece is amounted instead, and the spindle 30 is lowered. In a state where the spindle 30 abuts on the workpiece, the dimension of the reference block can be compared and measured by reading the displayed value of the digital display 50. In other words, the difference in dimension between the workpiece and the reference block can be measured.

Figure 4A:
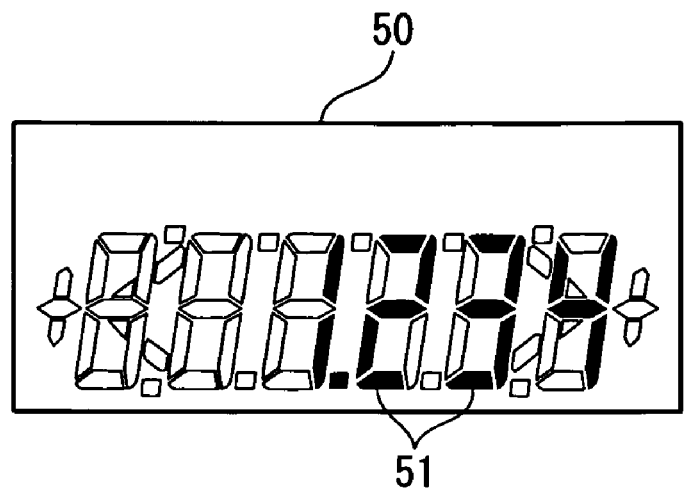
FIG. 4A and FIG. 4B respectively show displaying modes of the embodiment.
Figure 4B:
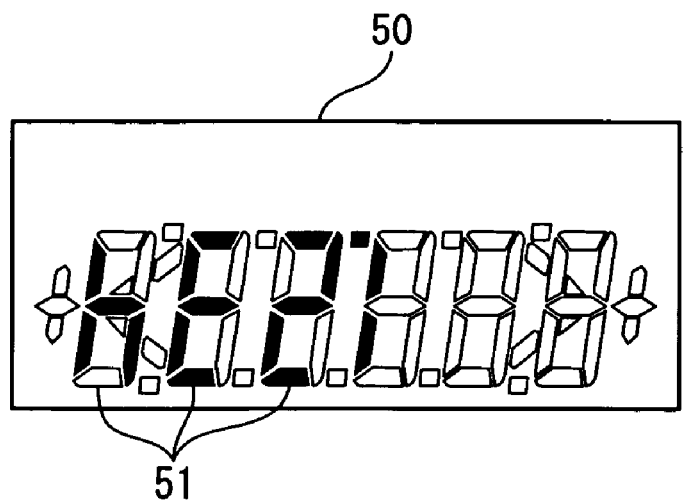

When the selection switch 24 is pressed, the figure displayed on the digital display 50 is inverted by 180°. In other words, when the digital display 50 has a displaying state as shown in FIG. 4A before the selection switch 24 is pressed, the digital display 50 will have a displaying state as shown in FIG. 4B after the selection switch 24 is pressed.

Thus, even when the measurement is performed in a state where the digital indicator 1 (the body case 10) is inverted by 180°, since the displayed value can be inverted by 180°, a user can easily read the displayed value without misreading.

Figure 5:
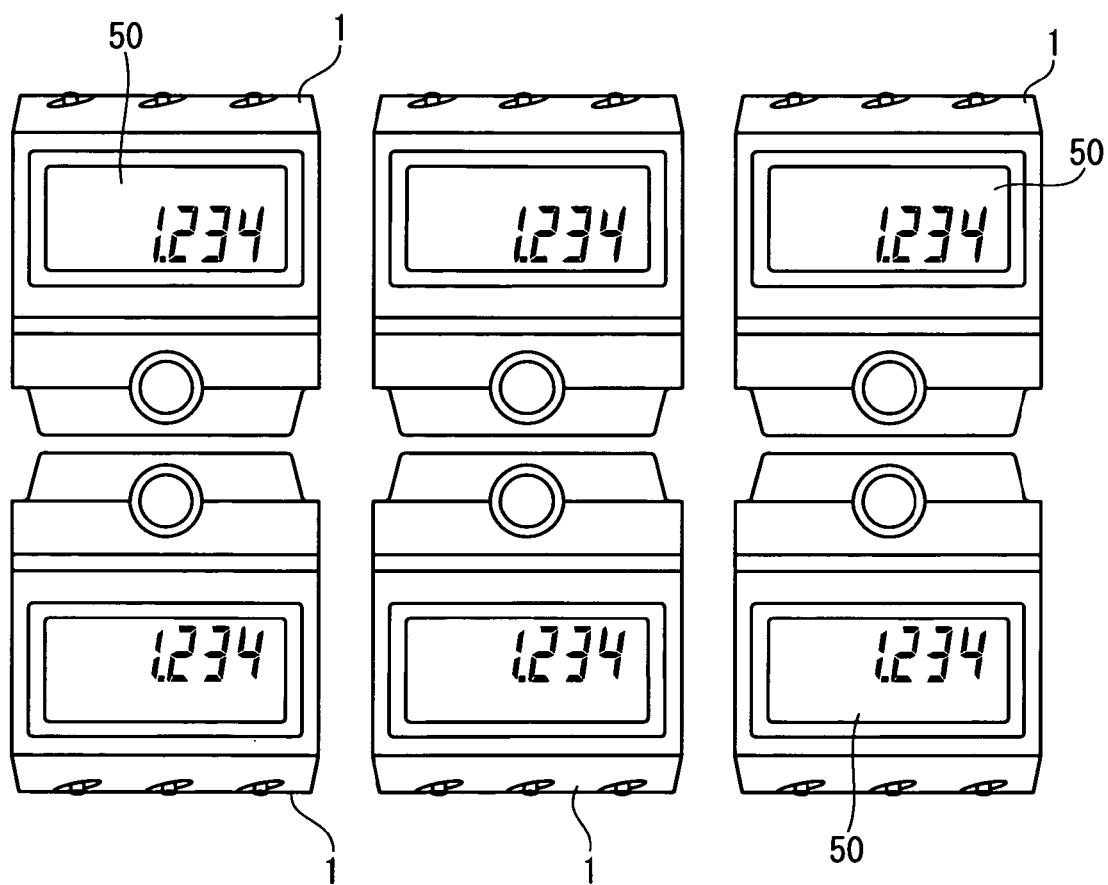
FIG. 5 is a plan view showing arrangement examples of the digital indicator of the embodiment.

For example, even when a plurality of the digital indicators 1 (the body cases 10) are disposed a long a component carrying line or the like on both sides in a state where the digital indicators 1 are arranged back to back as shown in FIG. 5, since the directions of the displayed values can be made the same by inverting the displayed values of the digital indicators 1 on one side (the upper side in FIG. 5) by 180°, the user can read the displayed value without misreading.

<Effect of Embodiment>

(1) Since the display surface of the digital display 50 is arranged on the body case 10 in an attitude substantially orthogonal to the moving direction of the spindle 30 and deviated from the moving axis of the spindle 30, the movement of the spindle 30 is not restricted by the digital display 50 even if a moving stroke of the spindle 30 is set long. Thus, the moving stroke of the spindle 30 can be set long.

(2) Since the display surface of the digital display 50 is arranged on the body case 10 in an attitude substantially orthogonal to the moving direction of the spindle 30, the displayed value of the digital display 50 can be read from the axial direction of the spindle 30. Thus, the advantage of a so called back-plunger type measuring instrument can be maintained.

(3) Since the digital display 50 is arranged on a surface of the body case 10, which supports the other end of the spindle 30 (namely, the upper wall 21B of the body case 10, which supports the end of the spindle 30 opposite to the end having the probe 31), when, for example, the digital indicator 1 is disposed in an attitude so that the spindle 30 extends in a vertical direction and the probe 31 is downward directed, the digital display 50 is on the upper side of the body case 10, and therefore the displayed value of the digital display 50 can be easily read. In other words, the displayed value of the digital display 50 can be read from right above.

(4) Since the output connector 25, which outputs the moving amount of the spindle 30 detected by the displacement detector 40 to the outside, is arranged on a surface of the body case 10 substantially parallel with the moving direction of the spindle 30, there is no concern that visibility of the digital display 50 might be impaired by a cable connected to the output connector 25. In other words, since the digital display 50 and the output connector 25 are respectively disposed on the body case 10 on surfaces orthogonal to each other, even when the cable is connected to the output connector 25, since the cable is drawn out in parallel with the display surface of the digital display 50, there is no concern that visibility of the digital display 50 might be damaged by the cable connected to the output connector 25.

(5) Since the switches 22, 23, 24 are arranged on the front wall 21A of the body case 10 (the lid frame 21), namely, on the surface of the body case 10 substantially parallel with the moving direction of the spindle 30, external force will not be applied in the axial direction of the spindle 30 even at the time when the switches 22, 23, 24 are pressed, and therefore stable switch operation can be achieved.

(6) Since the figure displayed on the digital display 50 can be inverted by 180°, in the case where the figure displayed on the digital display 50 is read from the axial direction of the spindle 30, the figure can be correctly read even from a direction inverted by 180°.

For example, when the measurement is performed in a state where the body case 10 is rotated by 180° around the axis of the spindle 30, the figure displayed on the digital display 50 is inverted by 180°. Even when the measurement is performed in this state, since the figure displayed on the digital display 50 can be inverted by 180°, the user can correctly read the figure displayed on the digital display 50 without changing his posture.

(7) Since the digital display 50 includes plural digits of 7-segment display elements 51 each being formed by arraying seven segments in the shape of "8", and since the display controller 60, which constitutes the display inversion selector, switches the lighting condition of the 7-segment display elements in accordance to the state of the selection switch 24 so that the figure displayed on the digital display 50 is inverted by 180°, the figure can be displayed in two different directions without employing additional display elements 51 inverted by 180°. Thus the digital indicator 1 can be economically configured.

(8) Since all assembly portions of the components are engaged with each other via the waterproof packings 13, 20, 28 so as to form a waterproofing structure, specifically, since the waterproof packings 20, 13, 28 are respectively provided between the base frame 11 and the lid frame 21 that constitute the body case 10, between the bottom wall 11A of the base frame 11 and the lid plate 14, and between the lid frame 21 and the battery lid 29, the waterproofing structure can be achieved with low cost and simple structure.

<Modifications>

It is to be understood that the present invention is not limited to the embodiment described above, and various modifications and improvements can be made as long as the objects of the present invention can be achieved.

For example, although in the embodiment described above, the digital display 50 is arranged on the body case 10 in an attitude substantially orthogonal to the moving direction of the spindle 30 and deviated to the front side from the moving axis of the spindle 30, the digital display 50 also can be arranged at a position deviated to the rear side or lateral side from the moving axis of the spindle 30. Further, the digital display 50 also can be circularly disposed around the moving axis of the spindle 30.

Further, although the switches 22, 23, 24 and the output connector 25 are arranged on the front wall 11A of the body case 10 in the embodiment described above, they also can be arranged on other surfaces. For example, the switches 22, 23, 24 and the output connector 25 also can be arranged on the upper surface (the upper walls 11B, 21B). With such a configuration, all operations can be performed from above. Thus, all operations including reading the displayed value on the digital display 50, pressing the switches, connecting the cable to the output connector 25 and the like can be performed from above.

Further, although the digital display 50 includes six digits of 7-segment display elements 51 in the embodiment described above, an alternative configuration may be employed in which display elements having directions inverted with respect to each other are provided in two rows. With such a configuration, only either one of the two rows of the display elements is lighted in accordance to the operation of the selection switch 24.

The priority application Number JP2005-263989 upon which this patent application is based is hereby incorporated by reference.

What is claimed is:

1. A digital measuring instrument comprising:
    a body case;
    a spindle provided to the body case, the spindle being movable in an axial direction of the spindle;
    a probe;
    a displacement detector that detects a moving amount of the spindle; and
    a digital display that digitally displays the moving amount detected by the displacement detector, wherein
    the body case has a box-like shape constructed by: a bottom wall; an upper wall, a lower wall and side walls which circumferentially extend from the bottom wall; and a front wall covering a distal side of the walls;
    the spindle is supported by the upper wall and the lower wall of the body case to be movable in the axial direction thereof and is projected to an outside of the body case from the lower wall;
    the probe is disposed on a projecting end of the spindle; and
    a display surface of the digital display is arranged on the upper wall of the body case in an attitude substantially orthogonal to the moving direction of the spindle and deviated from the moving axis of the spindle.

2. The digital measuring instrument according to claim 1, further comprising:
    an output connector for outputting the moving amount of the spindle detected by the displacement detector to the outside, the output connector being arranged on a surface of the body case substantially parallel with the moving direction of the spindle.

3. The digital measuring instrument according to claim 1, further comprising:
    a display inversion selector that inverts information displayed on the digital display by 180°.

4. The digital measuring instrument according to claim 3, wherein
    the digital display includes plural digits of 7-segment display elements each being formed by arraying seven segments in the shape of "8", and
    the display inversion selector has a selection switch and switches the lighting condition of the 7-segment display elements in accordance with the state of the selection switch so that a figure displayed on the digital display is inverted by 180°.

* * * * *